(12) United States Patent
Daniel et al.

(10) Patent No.: US 12,653,364 B2
(45) Date of Patent: Jun. 16, 2026

(54) FLOOR CLEANING SYSTEM

(71) Applicant: BSH Hausgeräte GmbH, Munich (DE)

(72) Inventors: Kristina Daniel, Bad Neustadt (DE);
Kai Schmitt, Saal (DE); **Frank
Schnitzer**, Bad Neustadt (DE)

(73) Assignee: BSH Hausgeräte GmbH, Munich (DE)

( * ) Notice: Subject to any disclaimer, the term of this
patent is extended or adjusted under 35
U.S.C. 154(b) by 78 days.

(21) Appl. No.: 18/006,897

(22) PCT Filed: Jul. 14, 2021

(86) PCT No.: PCT/EP2021/069576
§ 371 (c)(1),
(2) Date: Jan. 26, 2023

(87) PCT Pub. No.: WO2022/023037
PCT Pub. Date: Feb. 3, 2022

(65) Prior Publication Data
US 2023/0255427 A1 Aug. 17, 2023

(30) Foreign Application Priority Data

Jul. 30, 2020 (DE) ..................... 10 2020 209 608.2

(51) Int. Cl.
*A47L 9/28* (2006.01)
*A47L 11/24* (2006.01)
(Continued)

(52) U.S. Cl.
CPC .......... *A47L 9/2894* (2013.01); *A47L 9/2852*
(2013.01); *A47L 11/24* (2013.01); *A47L 11/28*
(2013.01);
(Continued)

(58) Field of Classification Search
None
See application file for complete search history.

(56) References Cited

U.S. PATENT DOCUMENTS 9,911,226 B2 3/2018 Hillen et al.
11,484,170 B2 11/2022 Arnold et al.
(Continued)

FOREIGN PATENT DOCUMENTS

DE 102009059215 A1 2/2011
DE 102009041362 A1 3/2011
(Continued)

OTHER PUBLICATIONS

Machine translation: DE102016210422A1; Kuhnel (Year: 2017).*

*Primary Examiner* — Natasha N Campbell
(74) *Attorney, Agent, or Firm* — Laurence A. Greenberg;
Werner H. Stemer; Ralph E. Locher

(57) ABSTRACT

A floor cleaning system includes a mobile, self-driving
apparatus and a portable additional apparatus for a user. The
self-driving apparatus, in particular, is a cleaning apparatus
for autonomous treatment of floor areas, such as a vacuum-
ing robot and/or sweeping robot and/or wiping robot. The
user apparatus has an operating unit, a communication unit,
and a position detection unit. Using the position detection
unit, the user defines the floor area to be cleaned in that the
user walks, with the additional apparatus, along a cleaning
path or delimiting path that can be transmitted to the mobile,
self-driving apparatus in order for the mobile, self-driving
apparatus to clean along the cleaning path or to clean the
floor area included within the delimiting path in accordance
with a cleaning request. There is also described a method for
the automatic treatment of floor areas with the aid of the
floor cleaning system.

10 Claims, 1 Drawing Sheet

(51) Int. Cl.

| | |
|---|---|
| *A47L 11/28* | (2006.01) |
| *A47L 11/40* | (2006.01) |
| *G05D 1/00* | (2024.01) |
| *G05D 1/222* | (2024.01) |
| *G05D 1/229* | (2024.01) |
| *G05D 1/249* | (2024.01) |
| *G05D 1/648* | (2024.01) |
| *G05D 105/10* | (2024.01) |

(52) U.S. Cl.
CPC ........ *A47L 11/4011* (2013.01); *G05D 1/0274* (2013.01); *G05D 1/222* (2024.01); *G05D 1/2297* (2024.01); *A47L 2201/04* (2013.01); *A47L 2201/06* (2013.01); *G05D 1/249* (2024.01); *G05D 1/648* (2024.01); *G05D 2105/10* (2024.01)

(56) References Cited

U.S. PATENT DOCUMENTS

| | | | | |
|---|---|---|---|---|
| 2005/0027399 | A1* | 2/2005 | Koh ..................... | G05D 1/0221 |
| | | | | 700/258 |
| 2019/0167059 | A1* | 6/2019 | Brown ................. | G05D 1/0033 |
| 2019/0320866 | A1 | 10/2019 | Thorne et al. | |

FOREIGN PATENT DOCUMENTS

| | | | | | |
|---|---|---|---|---|---|
| DE | 102014110265 | A1 | | 1/2016 | |
| DE | 102016210422 | A1 * | 12/2017 | .......... | G05D 1/0016 |
| DE | 102019101338 | A1 | | 7/2020 | |
| EP | 3424395 | A1 | | 1/2019 | |
| EP | 3111818 | B1 | | 6/2020 | |
| WO | 2019185930 | A1 | | 10/2019 | |

* cited by examiner

FLOOR CLEANING SYSTEM

FIELD AND BACKGROUND OF THE INVENTION

The invention relates to a floor cleaning system which has a mobile, self-driving apparatus, in particular a cleaning apparatus for autonomous treatment of floor areas such as a vacuuming robot and/or sweeping robot and/or wiping robot, and a portable additional apparatus for a user. Moreover, the invention relates to a method for automatic treatment of floor areas with the aid of a floor cleaning system.

Floor cleaning with mobile, self-driving apparatuses such as for instance robot vacuum cleaners is generally known. In addition to cleaning the entire area which can be reached by the robot (Clean All) and cleaning entire rooms (Room Cleaning), a cleaning of small areas (Spot Cleaning) is available here in order to select the floor areas to be cleaned. Selecting the Spot Cleaning function frequently takes place in an app by way of specifying the area center point of the area to be cleaned. In this way it is however in most cases not apparent to the user in a map view of the app where precisely the boundaries of the Spot Cleaning area are and which alignment this area has in the room. Moreover, the accuracy depends on a selected zoom and the size of the user's fingers. The Spot Cleaning is also in most cases limited to small areas below 1.2 m×1.2 m, whereby larger areas can therefore not be covered.

If the so-called Spot Cleaning Function is selected without the app, it is necessary for the user to carry the cleaning robot to the desired area, start the cleaning and then after cleaning carry the cleaning robot back to the base station. This therefore involves a floor cleaning process which is unmanageable, not user-friendly and laborious, however.

SUMMARY OF THE INVENTION

The object of the invention is therefore to avoid the afore-cited disadvantages according to the prior art and in particular to enable a user-friendly, manageable and preferably precise floor cleaning system, as well as to provide an improved and in particular simplified method for processing floor areas.

This object is achieved by a floor cleaning system having the features as claimed and by a method for processing floor areas having the features as claimed. Advantageous embodiments and developments are the subject matter of the dependent claims.

In accordance with the invention, a floor cleaning system has a mobile, self-driving apparatus and a portable additional apparatus for a user. The mobile, self-driving apparatus is in particular a cleaning apparatus for autonomous treatment of floor areas such as a vacuuming robot and/or sweeping robot and/or wiping robot and has an actuatable running gear, a controller and a communication element. The additional apparatus has an operating unit, a communication unit and a position determination unit, wherein using the position determination unit the user defines the floor area to be cleaned, by the user with the additional apparatus walking a cleaning or delimiting path, said cleaning or delimiting path being transmittable to the mobile, self-driving apparatus, in order to use the mobile, self-driving apparatus to clean along the cleaning path or a floor area included in the delimiting path in accordance with a cleaning request.

The inventive solution is characterized in that the user is not directed to routes, areas and possibilities defined by the robot software, but can instead predetermine and realize any cleaning area in the real environment. A flexible, manageable, user-friendly and precise predetermining of the floor area to be cleaned is enabled with the advantage that an adjustment in particular to all current conditions with respect to the selection of the floor area to be cleaned is possible. In particular, the predetermined floor area or the cleaning or delimiting path can be adjusted in an unrestricted manner by the user to the conditions of the flat to be cleaned or the room to be cleaned. There are no specifications here with respect to size, shape or alignment.

The walking of the cleaning or delimiting path represents an intuitive and simple control for the user, wherein at the same time the user's perceived feeling of control can be increased by the interaction of the user.

A floor cleaning system is to be understood to mean in particular any system which comprises at least a floor cleaning component and an operating component, such as at present the mobile, self-driving apparatus and the additional apparatus, wherein communication is possible at least in one direction between these apparatuses, and both apparatuses preferably communicate with one another.

A mobile, self-driving apparatus is to be understood to mean in particular a cleaning apparatus or lawn mower apparatus, which autonomously treats floor areas or lawns in particular within the household. This includes inter alia vacuuming and/or sweeping robots such as for instance robot vacuum cleaners, wiping robots such as for instance wet cleaning robots or robot lawnmowers. During operation (cleaning operation or lawnmower operation) these apparatuses preferably operate without user intervention or with as little use intervention as possible. For instance, the apparatus moves automatically in a predetermined room, in order to clean the floor in accordance with a predetermined and programmed process strategy.

A controller is at present understood to mean in particular any unit which comprises inter alia the communication element for transmitting and transferring data, parameters and/or drivers and software. The controller is therefore suited to communicating with the additional apparatus. The controller can moreover have a memory for the data to be transmitted.

The communication element and the communication unit are at present used to transmit and transfer data, parameters and/or drivers and software. In particular, the communication element is used to communicate with the additional apparatus and in particular with the communication unit, and vice versa.

An actuatable running gear is understood to mean any running gear which can be actuated by means of the controller and is at the same time suited to driving the mobile, self-driving apparatus to an intended location. To this end, the running gear preferably has a plurality of wheels or rollers.

An additional apparatus is at present understood to mean in particular any apparatus which is portable for a user, which is arranged outside of the mobile, self-driving apparatus, in particular differs from the mobile, self-driving apparatus, and is suited to displaying, providing, transmitting and/or transferring data, such as for instance a cellphone, a smartphone, a tablet and/or computer or laptop.

An operating unit is in particular understood to mean any unit which is suited to operating the additional apparatus, such as for instance an actual or virtual keypad, a touchpad and/or an associated monitor or display.

A position determination unit is understood to mean any unit which is suited to determining the position of the additional apparatus. To this end, inertial sensors (inertial measurement units; acceleration sensors and gyroscopes) are used for instance, which are integrated in the additional apparatus and measure the changes in position and location and can thus respond to movements of the additional apparatus. Alternatively or in addition, other and/or further position determination units (Bluetooth localization, satellite-assisted positioning, optical flow etc.) can be used to increase the positioning accuracy.

The invention is characterized in that the user with the additional apparatus starts an app, for instance, which, when a start button is actuated, begins a recording process of the position determination unit and records a movement and combines the two to form a cleaning path or delimiting path which is walked by the user. This data is then transmitted to the mobile, self-driving apparatus, in particular by way of the communication element and the communication unit, whereby the mobile, self-driving apparatus begins the floor cleaning along the cleaning path or the floor area included by the delimiting path in accordance with the cleaning request.

With an advantageous embodiment, a starting point of the cleaning or delimiting path is a location of the mobile, self-driving apparatus. The location is in particular the actual location of the mobile, self-driving apparatus. For instance, the location is the place of charging of the mobile, self-driving apparatus, on which in particular its base station stands. The recording of the path to be cleaned therefore at present begins on the mobile, self-driving apparatus itself. This is in particular advantageous in that the user already specifies the exact path to the mobile self-driving apparatus at the start. The user can advantageously define and determine from the start, in other words from the location of the mobile self-driving apparatus, the path which the mobile self-driving apparatus is to take. Avoiding obstacles or prior planning or programming a preferred path are therefore unnecessary. A simple, user-friendly handling, which is moreover barely prone to interference, is therefore advantageously enabled.

In order to start the determination of the cleaning or delimiting path, the user holds the additional apparatus over the mobile self-driving apparatus for instance and actuates a start key or a start button. From this location the user walks the desired cleaning or delimiting path, as a result of which this path is defined. When the path is completed, a stop key is pressed accordingly. Alternatively, it is possible for the start key to be held while the desired cleaning or delimiting path is walked. When the path is completed, in this case the start key is released whereby the cleaning or delimiting path is defined with a start and end point. By pressing a further key or by a repeated pressing of the start key, the indicated path and in particular its data can be transferred to the mobile, self-driving apparatus, which then traverses the defined path and carries out a corresponding cleaning.

With a further advantageous embodiment, the cleaning or delimiting path can be determined on the basis of a location of the mobile, self-driving apparatus. Accordingly, besides the location of the mobile, self-driving apparatus, there is at present no need for further reference points or position points of the room or the flat in order to define the floor area to be cleaned. The cleaning or delimiting path recorded by the user is therefore the only piece of information used by the mobile self-driving apparatus directly to define the floor area to be cleaned, and in particular to arrange this floor area spatially with respect to the location and accordingly with respect to the start position of the mobile, self-driving apparatus.

To this end, no absolute reference system or coordinate system of the room or flat is therefore required. A map view of the flat and the room, which is stored in the additional apparatus for instance, is additionally not required for a reliable and interference-free floor cleaning. From a user-friendly point of view, the walked cleaning or delimiting path can naturally be displayed in a map view on the additional apparatus, for instance in the assigned (cleaning) app. This is used here however only to visualize and control the path for the user and not to determine the floor area to be cleaned in respect of the flat or room.

With a further advantageous embodiment, the definition of the cleaning or delimiting path starts at a location of the mobile self-driving apparatus, wherein the cleaning of the floor area starts at a cleaning point on the cleaning path or the delimiting path defined by the user. It is therefore at present not imperative for the cleaning to begin directly at the location or at the base station of the mobile, self-driving apparatus. Only the walking of the path to be traversed by the user and thus the definition of the path per se starts on the mobile, self-driving apparatus itself.

For instance, the user with the additional apparatus starts the (cleaning) app at the location of the mobile, self-driving apparatus and actuates a start button. From this location the user moves to the point which he would like to be cleaned. The user then preferably presses a cleaning button, on the app for instance, and keeps this pressed. While the cleaning button is kept pressed, the user walks the cleaning path or circles the floor area to be cleaned. For the mobile self-driving apparatus, the delimiting path or cleaning path is therefore defined. When the cleaning or delimiting path is completed, the cleaning button can be released. By pressing a further key or by repeatedly pressing the start key, the path and its data can be transmitted to the mobile, self-driving apparatus, which now moves to the cleaning point and begins with the cleaning.

With a further advantageous embodiment, with an open cleaning path the cleaning of the floor area takes place exactly along the cleaning path, whereas with a closed delimiting path, the cleaning of the floor area additionally takes place within an area defined by the delimiting path. A path with start and end points which are separated from one another or differ from one another or a (floor) area filled (completely, approximately or only partially) by a cleaning path is to be understood to be an open cleaning path. A closed delimiting path by contrast is to be understood to be a path along an enclosing (floor) area with an (approximately) overlapping start and end point and without an enclosed cleaning path.

When a cleaning path is open, the mobile, self-driving apparatus preferably follows the defined cleaning path exactly and thus traverses a path, track or route drawn by the user. With a closed delimiting path by contrast, the edge of an area is generated from the path which has been left, said area being cleaned by the mobile, self-cleaning apparatus by circling and then (advantageously systematically) traversing (for instance by means of meandering). The distinction between an open cleaning path and closed delimiting path is preferably carried out automatically. Alternatively, it is conceivable for the user to manually specify on the additional apparatus which is the cleaning path and which is the delimiting path.

With an open cleaning path predefined by the user, it is also possible for instance for the mobile, self-driving apparatus to be equipped with a further function in addition to the cleaning function, such as for instance an operating function and/or conveying an object. To this end the user specifies the open cleaning path, for instance from a kitchen to a couch in the living room. If a person in the household is now located in the kitchen in order to prepare snacks, beverages and/or food, for instance, while another person remains on the couch in the living room, the person in the kitchen can place the already finished meals and/or beverages on the mobile self-driving apparatus and send the apparatus to the couch in the living room where the other person can accept the transported items.

A patrol function is also possible as a further function in the case of an open cleaning path. To this end, a fixed cleaning path is predetermined to the mobile, self-driving apparatus, for instance, along which the mobile self-driving apparatus drives for instance at predetermined times of the day and for instance scans the surroundings with a camera in order to uncover and/or detect abnormalities.

With a further advantageous embodiment, the cleaning or delimiting path can be stored in the controller of the mobile self-driving apparatus. The cleaning and delimiting path can particularly preferably be repeatably traversed by the mobile self-driving apparatus. By storing the recorded paths, these can advantageously be regularly and repeatedly cleaned, for instance. Moreover, it is conceivable to send the mobile self-driving apparatus on a so-called path tracking mode and/or to carry out patrol journeys. For repetition purposes, no repeated walking of the cleaning or delimiting path is advantageously required here on account of the possibility of storage, whereby a simple, user-friendly and reliable handling is thus enabled.

With a further advantageous embodiment, No-Go areas can be defined by the user by means of the cleaning or delimiting path and are excluded in particular by the cleaning request. The mobile, self-driving apparatus can as a result advantageously learn No-Go areas, without in the process defining the No-Go zones in the additional apparatus and in particular in the app at the respective correct point in a map. By the user simply walking and in particular avoiding obstacles for instance when the cleaning or delimiting path is determined, a reliable, obstacle-free, interference-free and simple determination of the cleaning or delimiting path is enabled.

In accordance with the invention, a method for automatic treatment of floor areas with the aid of a floor cleaning system comprises the following method steps:

determining the cleaning or delimiting path with the additional apparatus by the user walking this path, transmitting the walked cleaning or delimiting path to the mobile, self-driving apparatus, beginning the cleaning along the walked cleaning path or of the floor area included by the delimiting path in accordance with the cleaning request.

Any features, configurations, embodiments and advantages relating to the floor cleaning system can also be used in conjunction with the inventive method and vice versa.

The inventive solution therefore provides that the user prespecifies to the mobile self-driving apparatus a floor area to be cleaned by means of inspecting this floor area with the additional apparatus. By means of the user-dependent inspection, the predetermined floor area can be adjusted in an unrestricted manner to the conditions of a flat such as for instance existing obstacles or stairs in a simple and customer-focused manner. Here no specifications are given with respect to the size, shape or alignment of the floor area to be cleaned. An interaction by the user and at the same time an inspection option by the user relating to the floor area to be cleaned can be realized in this way. Moreover, the walking of the floor area to be cleaned represents an intuitive and simple control for the user.

The precise approach to this is explained in conjunction with the floor cleaning system and is used here accordingly.

With an advantageous embodiment, the cleaning or delimiting path is determined on the basis of a location of the mobile, self-driving apparatus. Further reference points, reference systems or coordinate systems are at present advantageously not required. The location of the mobile, self-driving apparatus is accordingly required as a single reference point for determining the cleaning or delimiting path. A user-friendly, interference-free and simple handling is thus ensured for the user.

The invention is explained in more detail using the subsequent figures only showing examples, in which:

DETAILED DESCRIPTION OF THE INVENTION

Figure 1:
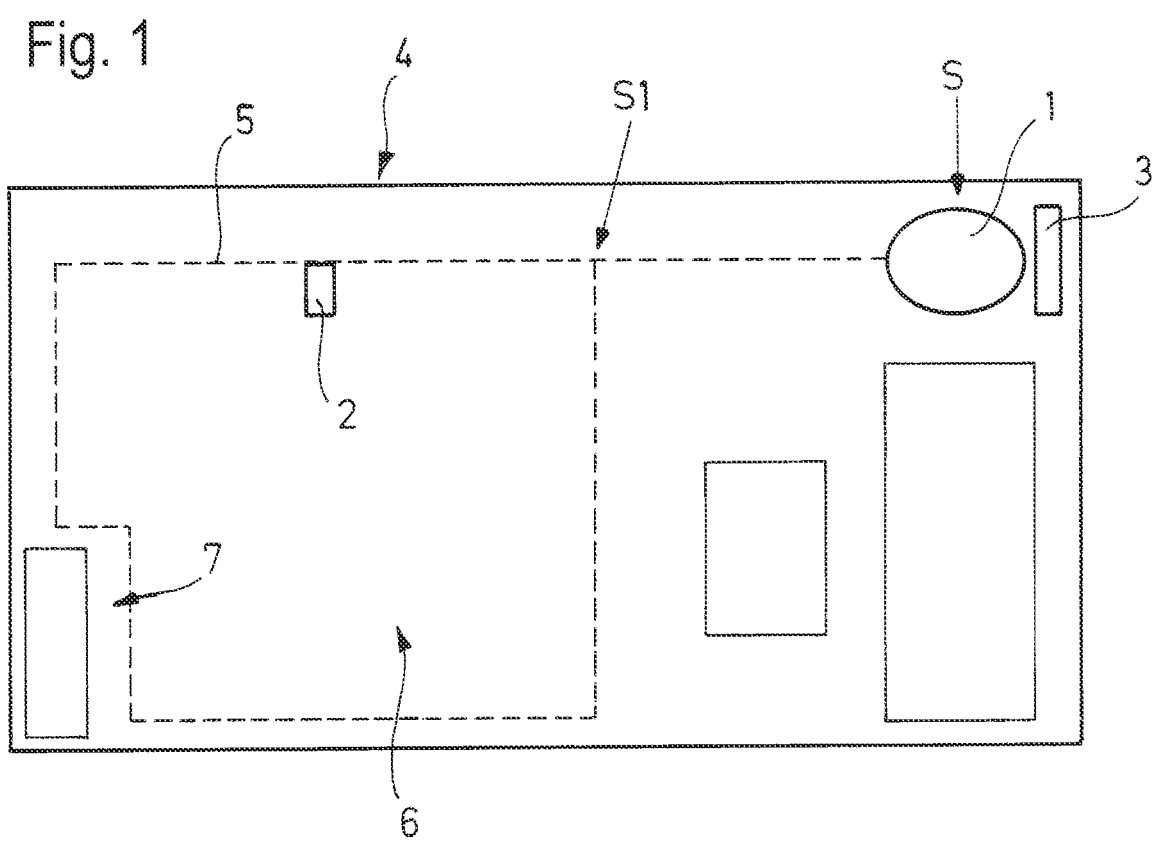
FIG. 1: shows a schematic view of an exemplary embodiment of an inventive method for automatic treatment of floor areas with the aid of a floor cleaning system.

FIG. 1 shows a schematic representation of a method for automatic treatment of floor areas with the aid of a floor cleaning system having a mobile, self-driving apparatus 1 and an additional apparatus 2. The figure shows by way of example a drawing of a view onto a room 4 to be cleaned.

The mobile, self-driving apparatus 1 is for instance a floor cleaning robot, which stands on its base station 3 and is to clean the room 4 in accordance with its cleaning request. The additional apparatus 2 is used to determine the floor area to be cleaned, said additional apparatus being a cellphone or smartphone of the user with a corresponding app, which is responsible for the cleaning program of the floor cleaning robot.

In order to determine the floor area to be cleaned, the user starts the corresponding app on the additional apparatus 2, in particular the control process. By pressing a start key, the recording process begins for the position determination unit in the additional apparatus 2, in particular the inertial sensors, acceleration sensors and/or gyroscope. The user starts this process while holding the additional apparatus 2 over the mobile, self-driving apparatus 1. From this starting point S, the user now walks up to a point S1, at which he would like to start the cleaning. The user then presses a further key on the app, for instance a cleaning key and keeps this pressed. While the cleaning key is kept pressed, the user circles the floor area 6 to be cleaned along a delimiting path 5. For the mobile, self-driving apparatus 1, the outline of the floor area 6 to be cleaned is therefore defined. When the circulation is concluded at point S1, the user releases the cleaning key. A representation of the circulation can be shown in a map view of the app in the additional apparatus 2 for controlling the determined data for the user. By repeatedly pressing the start key, the determined data is transmitted to the mobile self-driving apparatus 1, which then carries out a cleaning process along the delimiting path 5 and on the floor area encircled by the delimiting path 5. In particular, the mobile self-driving apparatus 1 moves from its starting point S to the point S1 and starts the cleaning there. The delimiting path 5 recorded by the user is the only piece of information which is used directly by the mobile, self-driving apparatus 1. The path covered by the user since the start of the process (in other words from the first press of the start key), in other words the path between the starting point S and the point S1, up to the beginning of the circulation of the floor area is used exclusively to assign or arrange the floor area spatially with respect to the starting point S.

So-called No-Go zones 7 can additionally be defined with the additional apparatus 2. For instance, obstacles about which the mobile, self-driving apparatus 1 is to move can thus be predetermined. To this end, when the boundary path 5 is determined, the user moves easily about the obstacle, whereby the path predetermined to the mobile self-driving apparatus 1 likewise moves about the obstacle. This is characterized as a simple possibility of a user defining obstacles. A dragging by the finger of so-called No-Go zones to the correct point in a map in the app is therefore advantageously not necessary.

In addition, the delimiting path 5 can be stored and saved in a memory of the mobile, self-driving apparatus 1. As a result, a regular and repeatable cleaning process is possible.

In the exemplary embodiment in FIG. 1, the user has defined a closed delimiting path 5 with the additional apparatus 2. This means that the starting point and the end point almost overlap one another at the point S1. The delimiting path 5 accordingly completely encloses the floor area 6. In this regard, an area which is cleaned by the mobile, self-driving apparatus 1 by circulating along the delimiting path 5 and then systematically walking (e.g. by means of meandering) is generated as the cleaning area from the delimiting path.

It is alternatively possible to define an open path with the additional apparatus 2, in other words a cleaning path with start and end points which are separated from one another. An exemplary embodiment of this type is shown in FIG. 2.

Figure 2:
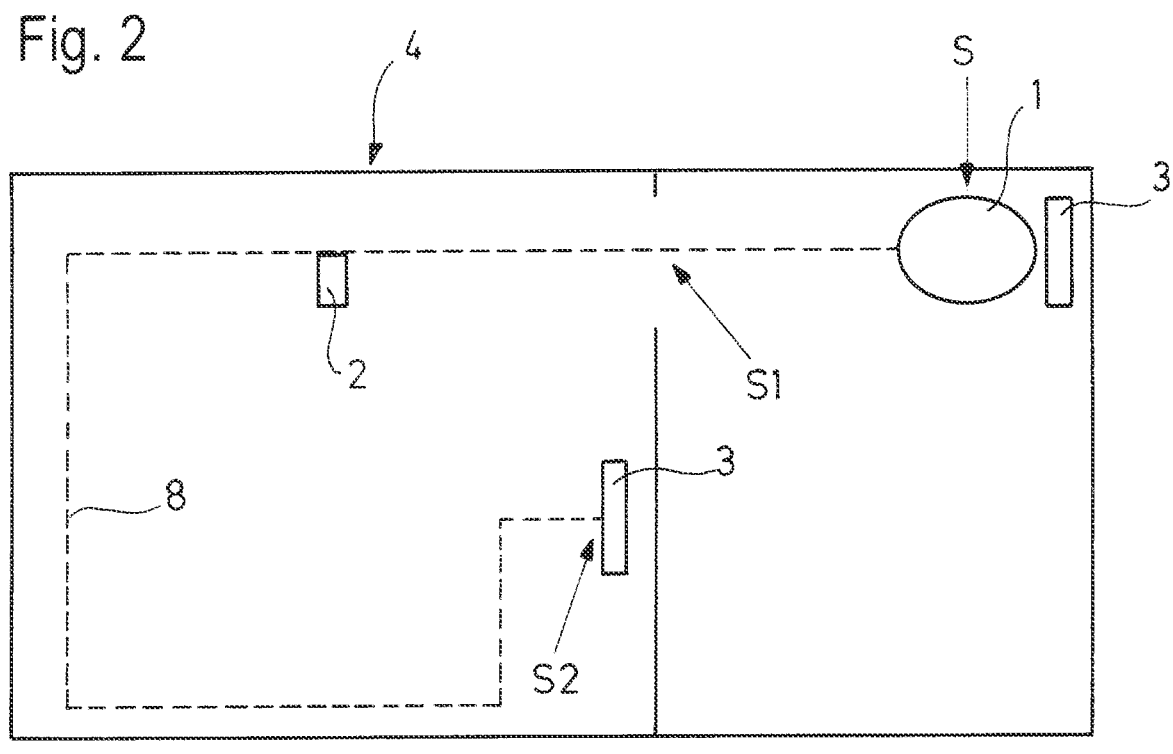
FIG. 2: shows a further schematic view of an exemplary embodiment of an inventive method for automatic treatment of floor areas with the aid of a floor cleaning system.

FIG. 2 shows by way of example a drawing of a view onto a room 4 to be cleaned. In this context the mobile, self-driving apparatus 1 is in turn at its base station 3. In order to define the cleaning path 8, at the location S of the mobile self-driving apparatus 1 with the additional apparatus 2 the user begins the recording of the desired cleaning path 8, for instance by pressing the start key. At the point S1, the user can fix the start of the cleaning process by pressing the cleaning key for instance. The user now traverses the desired cleaning path 8, which ends at a point S2 which differs from the point S1, for instance at a further base station 3. For instance, by repeatedly pressing the start key, the defined cleaning path 8 or its data is transmitted to the mobile self-driving apparatus 1, which begins with the cleaning.

With a so-called open path, the mobile, self-driving apparatus 1 follows the predetermined cleaning path 8 exactly. The mobile, self-driving apparatus 1 therefore tracks the path drawn by the user. Here, contrary to the closed path in FIG. 1, no area to be cleaned is generated in the process.

The traversal of these open paths can additionally be used for patrol journeys for instance. This is particularly suited to mobile, self-driving apparatuses 1, which have for instance an integrated camera and/or a streaming function. Furthermore, the traversal of open paths can additionally be associated with an operating function and/or conveyance of an object, in which the mobile, self-driving apparatus 1 is used as a means to transport objects such as snacks, food and/or beverages.

The invention claimed is:

1. A floor cleaning system, comprising:
a mobile, self-driving apparatus, being a cleaning apparatus for an autonomous treatment of floor areas, said apparatus having an actuatable running gear, a controller, and a communication element;
a portable additional apparatus for a user, said additional apparatus having an operating unit, a communication unit for communication with said communication element of said apparatus, and a position determination unit;
wherein said position determination unit is configured to define a floor area to be cleaned upon being moved by the user along a cleaning or boundary path by:
providing, on said additional apparatus, a user interface generated by instructions executed by the operating unit, the user interface including a start button and a cleaning button for the user to press,
pressing the start button at the location of the mobile, self-driving apparatus,
moving said additional apparatus to a desired point and pressing the cleaning button,
with the cleaning button pressed and held, moving said additional apparatus along the cleaning or boundary path, and releasing the cleaning button thereafter, and
transferring the cleaning or boundary path to said mobile, self-driving apparatus, and said mobile, self-driving apparatus being configured to clean along the cleaning path or to clean a floor area enclosed by the boundary path in accordance with a cleaning request; and
when the cleaning path is an open cleaning path, a cleaning of the floor area takes place exactly along the cleaning path, and when the boundary path is a closed boundary path, the cleaning of the floor area additionally takes place within an area defined by the boundary path; and
wherein a definition of the cleaning or boundary path starts at a location of said mobile self-driving apparatus, a cleaning of the floor area to be cleaned starts at a cleaning point on the cleaning path or the boundary path defined by the user and a path of said mobile, self-driving apparatus to said cleaning point of the cleaning path or the boundary path is defined by a path defined by the user, and the cleaning does not begin directly at the location of the mobile, self-driving apparatus.

2. The floor cleaning system according to claim 1, wherein said mobile, self-driving apparatus is at least one device selected from the group consisting of vacuuming robot, a sweeping robot, and a wiping robot.

3. The floor cleaning system according to claim 1, wherein a starting point of the cleaning or boundary path is a location of said mobile, self-driving apparatus.

4. The floor cleaning system according to claim 1, wherein the cleaning or boundary path is determined on a basis of a location of said mobile, self-driving apparatus.

5. The floor cleaning system according to claim 1, wherein said controller of said mobile, self-driving apparatus is configured to store the cleaning or boundary path.

6. The floor cleaning system according to claim 5, wherein said self-driving apparatus is configured to repeatedly traverse the cleaning path and the boundary path.

7. The floor cleaning system according to claim 1, wherein the system is configured to enable the user to define No-Go areas via the cleaning or boundary path.

8. The floor cleaning system according to claim 7, wherein the No-Go areas are excluded from the cleaning request.

9. A method for an automatic treatment of a floor area, the method comprising:

providing a floor cleaning system according to claim 1;

determining a cleaning path or boundary path with the additional apparatus by the user walking this path;

transmitting the walked cleaning path or boundary path to the mobile self-driving apparatus; and beginning the treatment along the walked cleaning path or cleaning the floor area enclosed by the boundary path in accordance with a cleaning request; and cleaning the floor area exactly along the cleaning path when the cleaning path is an open cleaning path, and cleaning the floor area within an area defined by the boundary path when the boundary path is a closed boundary path.

10. The method according to claim 9, which comprises determining the cleaning path or boundary path on a basis of a location of the mobile, self-driving apparatus.

\*  \*  \*  \*  \*